(12) United States Patent
Odashiro et al.

(10) Patent No.: US 12,535,365 B2
(45) Date of Patent: Jan. 27, 2026

(54) THERMOSENSITIVE SENSOR

(71) Applicant: G-QUEST CO., LTD., Atsugi (JP)

(72) Inventors: Ken Odashiro, Atsugi (JP); Midori Niguchi, Atsugi (JP)

(73) Assignee: G-QUEST CO., LTD., Atsugi (JP)

( * ) Notice: Subject to any disclaimer, the term of this patent is extended or adjusted under 35 U.S.C. 154(b) by 323 days.

(21) Appl. No.: 18/479,858

(22) Filed: Oct. 3, 2023

(65) Prior Publication Data

US 2024/0288320 A1   Aug. 29, 2024

(30) Foreign Application Priority Data

Feb. 28, 2023 (JP) ................. 2023-029120
Jun. 8, 2023 (JP) ................. 2023-094523

(51) Int. Cl.
*G01K 11/06* (2006.01)
*G01K 7/36* (2006.01)

(52) U.S. Cl.
CPC ........... *G01K 11/06* (2013.01); *G01K 7/36* (2013.01)

(58) Field of Classification Search
CPC ................ G01K 11/06; G01K 7/36
USPC ................. 374/208, 163
See application file for complete search history.

(56) References Cited

U.S. PATENT DOCUMENTS

| 4,144,532 A * | 3/1979 | Boyd ........... F25D 29/008 |
| | | 248/312.1 |
| 7,063,041 B2 | 6/2006 | Odashiro |
| 2004/0228387 A1* | 11/2004 | Palazoglu ......... G01K 7/36 |
| | | 374/E7.039 |

FOREIGN PATENT DOCUMENTS

| JP | H02288125 A | * | 11/1990 | |
| WO | WO-2025154579 A1 | * | 7/2025 | ........... H01L 21/31 |
| WO | WO-2025184579 A1 | * | 9/2025 | ........... B01L 3/502 |

* cited by examiner

*Primary Examiner* — Mirellys Jagan
(74) *Attorney, Agent, or Firm* — FLYNN THIEL, P.C.

(57) ABSTRACT

A thermosensitive sensor including a pair of magnet pieces having electrical conductivity and connected to ends of lead wires, or which includes a magnet piece and a metal piece having electrical conductivity and being connected to one end of a first lead wire, the metal piece being of soft magnetic material and connected to one end of a second lead wire. A thermal melting substance piece is sandwiched between the magnet pieces or between the magnet piece and the metal piece. The thermal melting substance piece is nonconductive and in solid form, and the thermal melting substance piece causes a phase transition from solid to liquid at a predetermined temperature. The magnet pieces or the magnet piece and the metal piece, with the thermal melting substance piece sandwiched between them are maintained out of contact with each other and are housed in a container.

12 Claims, 4 Drawing Sheets

THERMOSENSITIVE SENSOR

CROSS-REFERENCE TO RELATED APPLICATIONS

This claims priority from Japanese Application No. 2023-029120, filed Feb. 28, 2023, and Japanese Application No. 2023-094523, filed Jun. 8, 2023, the disclosures of which are hereby incorporated by reference in their entireties.

FIELD OF THE INVENTION

The present invention relates to thermosensitive sensors and, more particularly, to thermosensitive sensors mounted to various types of equipment requiring temperature control in order to irreversibly indicate that a pre-selected temperature has been reached.

BACKGROUND OF THE INVENTION

It is obvious that the temperature control over the various types of equipment is important to the stable operation of the equipment. Upon a pre-selected temperature being reached, a temperature sensitive label indicates the fact through a coloring phenomenon. Such a temperature sensitive label has conventionally widely been used for temperature control by being affixed to equipment under temperature control.

An example of the currently dominant temperature sensitive labels includes, as disclosed in U.S. Pat. No. 7,063,041 B2, a sheet-like opaque thermosensitive material with thin paper impregnated with a thermal melting substance which melts at a predetermined selected temperature to cause a phase transition from solid to liquid, such as wax, a chemical substance or the like. The thermosensitive material is placed on top of a colored side of both sides of paper, so that the colored side of the color paper, which has been shielded to be invisible from outside, is made transparently visible by the melting of the thermal melting substance. The temperature sensitive label thus irreversibly indicates the fact that the selected temperature has been exceeded. The temperature sensitive label may be easily affixed to a desired area of any type of equipment and can be suitably used in a narrow space, as well as does not require a power supply and the like and therefore the temperature sensitive label is inexpensive. Because of this, the temperature sensitive label is widely used in all industrial areas.

However, in the temperature control using the temperature sensitive label, the fact that the selected temperature has been exceeded is not able to be known unless the temperature sensitive label is directly visually checked at the place to which the temperature sensitive label is affixed. The temperature sensitive label is impractical for the temperature control performed at remote locations, at high elevations, in confined areas, at locations under the environments harmful to humans, or the like.

BRIEF SUMMARY OF THE INVENTION

If a temperature change at an installation location can be electrically detected and translated into electrical signals to be carried to the outside, this will enable temperature detection at remote locations, at high elevations, in confined areas, at locations under the environments harmful to humans, or the like. For that purpose, a more complicated structure than the aforementioned temperature sensitive label using the coloring phenomenon is required, which in turn involves an increase in manufacturing costs. Therefore, such a configuration cannot be absolutely employed as an alternative to the conventional temperature sensitive label with a major advantage of being inexpensive.

The present inventor has industriously studied to achieve a thermosensitive sensor capable of irreversibly detecting temperature at low costs and also with high accuracy even in a location where using the conventional temperature sensitive label is difficult, such as remote locations, high elevations, confined areas, locations under the environments harmful to humans, or the like. As a consequence, the inventor has successfully developed a breakthrough thermosensitive sensor capable of being installed effortlessly and smoothly as much as the conventional temperature sensitive label is, and also capable of making notification of a detection result to a remote location, which is herein disclosed as the invention.

DETAILED DESCRIPTION OF THE INVENTION

An embodiment of a thermosensitive sensor according to the present invention will now be described with reference to FIG. 1 to FIG. 9.

Figure 5:
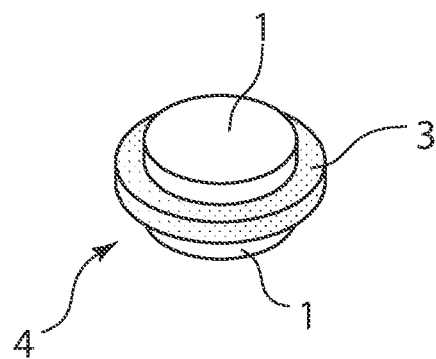
FIG. 5 is an enlarged perspective view of a thermosensitive element composed of a pair of magnet pieces and a thermal melting substance piece in the thermosensitive sensor illustrated in FIG. 1.
Figure 6:
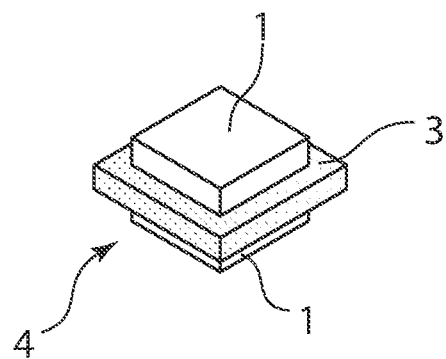
FIG. 6 is an enlarged perspective view of another example of the thermosensitive element in the thermosensitive sensor.

Reference number 1 indicates a pair of magnet pieces each formed in a small-diameter disk shape and having electrical conductivity. The magnet pieces are placed to face each other to maintain the relative positional relationship such that N pole and S pole of the magnet pieces are magnetically attracted to each other. It is noted that, in the example, the magnet piece 1 is formed in a disk shape as illustrated in FIG. 5, but the magnet piece 1 may be formed in a plate shape or a block shape as illustrated in FIG. 6, or in any shape.

Figure 7:
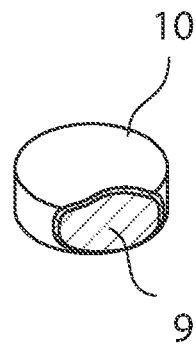
FIG. 7 is an enlarged perspective view of another example of the magnet piece in the thermosensitive sensor.

Of prime importance is that the magnet piece 1 has electrical conductivity. For the magnet piece 1, an alnico magnet or the like is suitably used. Alternatively, as illustrated in FIG. 7, a soft magnetic metal 10 may cover the outer side of a nonconductive magnet 9 having no electrical conductivity, such as ferrite magnet or the like.

Then, a nonconductive, solid-like thermal melting substance piece 3 formed in a plate shape is sandwiched between the pair of magnet pieces 1, in which the magnet piece 1, the thermal melting substance piece 3 and the magnet piece 1 are placed on top of one another in this order, thus forming a thermosensitive element 4.

Figure 3:
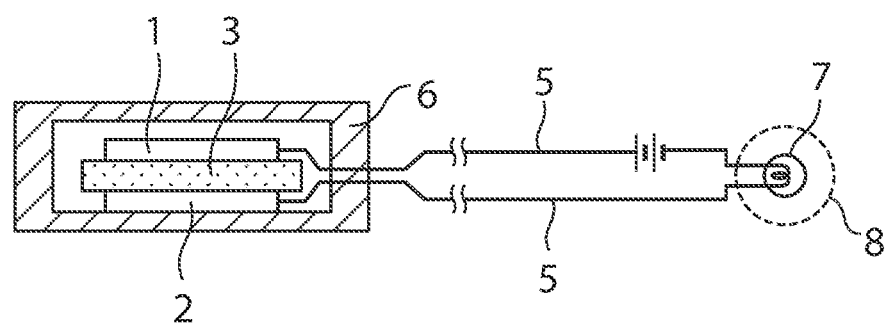
FIG. 3 is a cross-sectional view of another example embodiment of a thermosensitive sensor according to the present invention.
Figure 4:
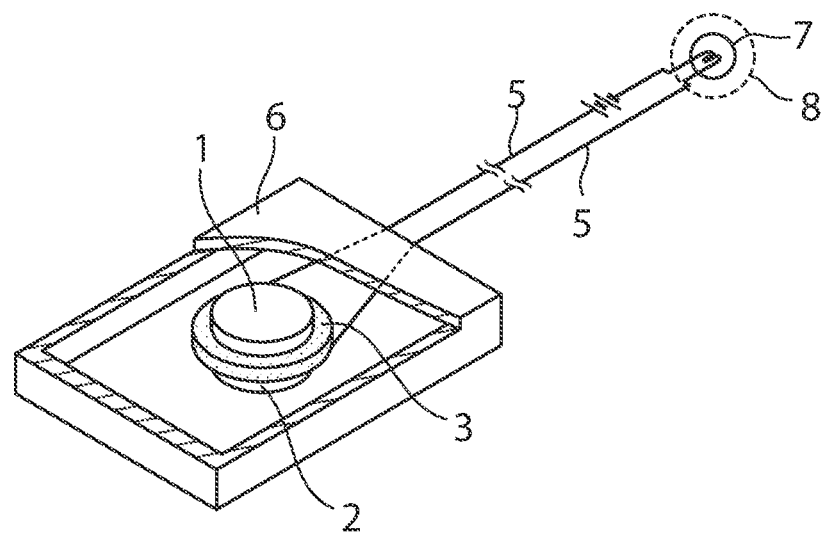
FIG. 4 is a partial cutaway perspective view of the thermosensitive sensor.

It is noted that, in the example, the thermal melting substance piece 3 is sandwiched between the pair of magnet pieces 1, but as illustrated in FIG. 3 and FIG. 4, one of the magnet pieces 1 may be replaced with a metal piece 2 essentially consisting of soft-magnetic metal having a property of being magnetically attracted. In this case, the magnet piece 1, the thermal melting substance piece 3 and the metal piece 2 are placed on top of one another in this order in order to form a thermosensitive element.

In this case, the metal piece 2 is required to have a property of being attracted to a magnet as well as having electrical conductivity. Therefore, steel material which is soft magnetic material is suitably used.

A thermal melting substance used for the thermal melting substance piece 3 is a substance that melts at a pre-selected temperature to cause a phase transition from solid to liquid. The substance corresponds to a chemical substance such as trilaurin, myristic acid, behenic acid, stearic acid amide, wax consisting predominantly of straight-chain hydrocarbons, and/or the like, which is basically the same as the thermal melting substance used in the conventional thermosensitive labels.

Further, one end of lead wires 5 are connected respectively to the magnet pieces 1 or to the magnet piece 1 and the metal piece 2.

Further, as illustrated in FIG. 1 to FIG. 4, the thermosensitive element 4 is housed in a synthetic resin-made container 6.

Figure 8:
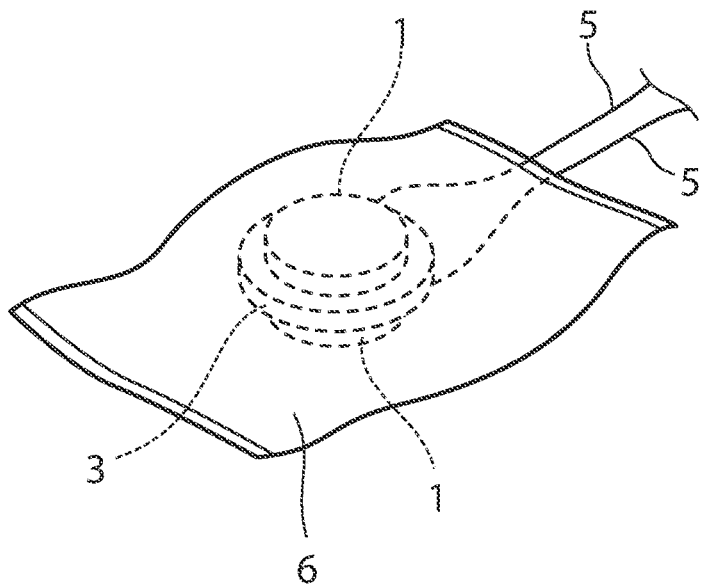
FIG. 8 is an enlarged perspective view of another example of a housing in the thermosensitive sensor.

In the examples, the container 6 is formed in a flat, hollow box shape using soft synthetic resin as raw materials. However, the container 6 may be formed in a bag shape made of soft synthetic resin as illustrated in FIG. 8, or in any shape as long as the thermosensitive element 4 can be housed in the internal space thereof.

Figure 9:
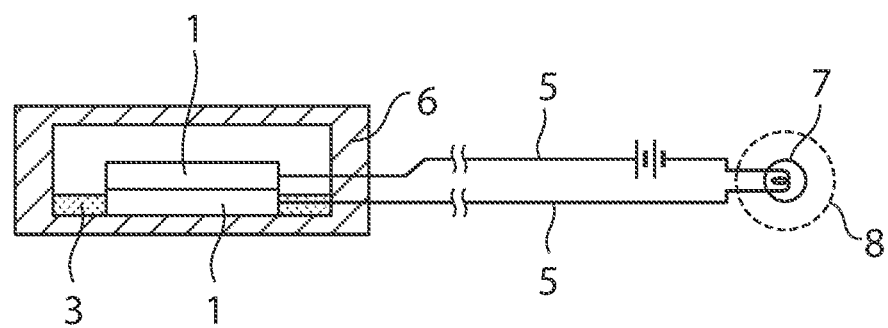
FIG. 9 is a cross-sectional view where the thermal melting substance piece melts, so that the magnet pieces are magnetically brought into intimate contact with each other to form a circuit.

The examples have such configurations as described above, in which for use of the thermosensitive sensor, the thermosensitive sensor is mounted to a desired position and/or placed on a desired location of equipment under temperature measurement, and also the lead wires 5 are connected, at the respective one end, to the magnet pieces 1 or to the magnet piece 1 and the metal piece 2, and then are extended to a desired observation site installed with an indicator 8 such as an electric-light bulb 7 and/or the like. Thus, upon a predetermined selected temperature being exceeded at the mounted position or the placement location of the equipment, as illustrated in FIG. 9, the thermal melting substance piece 3 sandwiched between the magnet pieces 1 or between the magnet piece 1 and the metal piece 2 within the container 6 melts to be changed into liquid form. Then, since the magnet pieces 1 or the magnet piece 1 and the metal piece 2 are magnetically attracted toward each other, the thermal melting substance piece 3 in liquid form is forcibly pushed out between the magnet pieces 1 or between the magnet piece 1 and the metal piece 2, so that the magnet pieces 1 or the magnet piece 1 and the metal piece 2 are magnetically brought into strong intimate contact with each other to establish electric connection with each other.

Therefore, the pair of lead wires 5 respectively connected to the magnet pieces 1 or to the magnet piece 1 and the metal piece 2 conducts electricity so that the electric-light bulb 7 as the indicator 8 installed in the observation site, or the like is turned on to indicate the fact that the selected temperature has been exceeded.

It is noted that even if the temperature at the installation location of the container 6 falls to or below the selected temperature after exceeding the selected temperature, and the thermal melting substance of the thermal melting substance piece 3 turns back into solid again, the magnetic junction state between the magnet pieces 1 or between the magnet piece 1 and the metal piece 2 is firmly maintained as it is, so that the fact that the selected temperature has been exceeded remains irreversibly indicated without any change.

Also, because the junction between the magnet pieces 1 or between the magnet piece 1 and the metal piece 2 is caused by the magnetic force, the junction state is stably maintained even if vibration is applied to the thermosensitive sensor.

Figure 1:
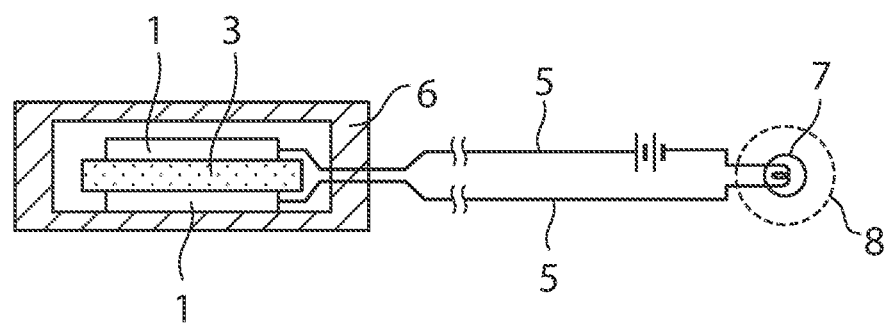
FIG. 1 is a cross-sectional view of an example embodiment of a thermosensitive sensor according to the present invention.
Figure 2:
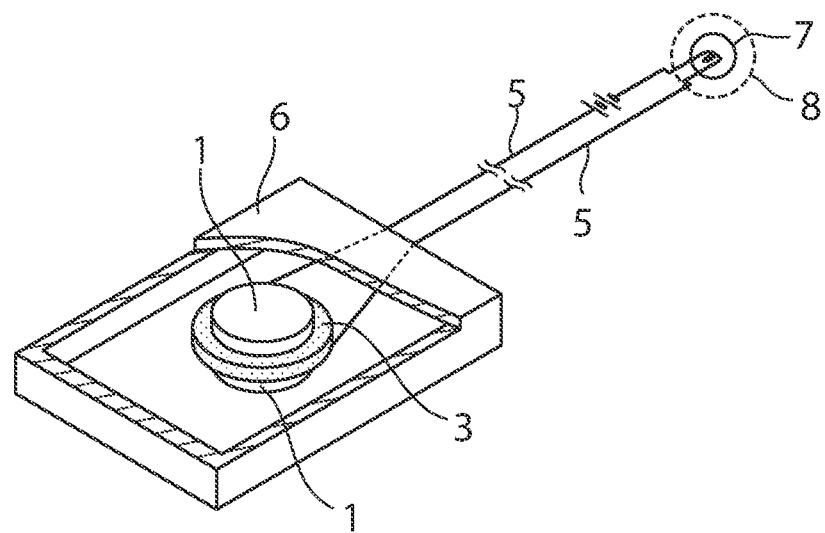
FIG. 2 is a partial cutaway perspective view of the thermosensitive sensor.

It is noted that in the example with the thermal melting substance piece 3 sandwiched between the pair of magnet pieces 1 as illustrated in FIG. 1 and FIG. 2, because the pair of magnet pieces 1 are magnetically attracted to each other, the attractive force is very strong. Therefore, a sufficient attractive force is ensured even if the magnet piece 1 used is small in size, so that the entire thermosensitive sensor can be made compact.

In this manner, the thermosensitive sensor according to the examples uses a simple and reliable way to use the magnetic force to cause the junction. Therefore, the fact that a selected temperature has been exceeded at an installation location may be precisely, reliably and stably detected and extracted as electrical signals, thus enabling implementation of irreversible temperature detection at low costs and with high precision even in a location where using the conventional temperature sensitive label is difficult, such as remote locations, high elevations, confined areas, locations under the environments harmful to humans, or the like.

Effect of the Invention

For use of the thermosensitive sensor, the thermosensitive sensor is mounted to a desired position and/or placed on a desired location of equipment under temperature measurement, and also the lead wires connected thereto are extended to a desired observation site at which an indicator is placed such as an electric-light bulb and/or the like. Thus, upon a predetermined selected temperature being exceeded at the mounted position or the placement location of the equipment, the thermal melting substance piece sandwiched between the magnet pieces or between the magnet piece and the metal piece melts to be changed into liquid form. Then, since the magnet pieces or the magnet piece and the metal piece are magnetically attracted to each other, the thermal melting substance piece is changed into liquid form and simultaneously forcibly pushed out between the magnet pieces or between the magnet piece and the metal piece, so that the magnet pieces or the magnet piece and the metal piece are magnetically brought into strong intimate contact with each other to establish electric connection with each other. Therefore, the pair of lead wires respectively connected to the magnet pieces or to the magnet piece and the metal piece conducts electricity so that the electric-light bulb installed in the observation site, or the like, is turned on to indicate the fact that the selected temperature has been exceeded.

Even if the temperature at the installation location of the thermosensitive sensor falls to or below the selected temperature after exceeding the selected temperature, the magnetic junction state between the magnet pieces or between the magnet piece and the metal piece is firmly maintained as it is, so that the fact that the selected temperature has been exceeded remains irreversibly indicated without any change.

Because the junction between the magnet pieces or between the magnet piece and the metal piece is caused by the magnetic force, the junction state is stably maintained even if vibration is applied to the thermosensitive sensor.

In this manner, because the thermosensitive sensor uses a simple and reliable way to use the magnetic junction between the magnet pieces and/or between the magnet piece and the metal piece, the fact that a selected temperature has been exceeded at an installation location may be precisely, reliably and stably detected and extracted as electrical signals. Therefore, the thermosensitive sensor has a beneficial effect of enabling implementation of irreversible temperature detection at low costs and with high precision even in a location where viewing the conventional temperature sensitive label is difficult, such as remote locations, high elevations, confined areas, locations under the environments harmful to humans, or the like. Further, the thermosensitive sensor has a great deal of potential in various industrial fields requiring temperature control, such as electric power industry, food manufacturing industry, semiconductor manufacturing industry, railway transport industry and the like.

What is claimed is:

1. A thermosensitive sensor, comprising:
   a pair of magnet pieces that have electrical conductivity and are each respectively connected to one end of lead wires;
   a thermal melting substance piece that is sandwiched between the pair of magnet pieces, the thermal melting substance piece being nonconductive and in solid form, the thermal melting substance piece causing a phase transition from solid to liquid at a predetermined temperature; and
   a container housing the pair of magnet pieces and the thermal melting substance piece with the pair of magnet pieces maintained out of contact with each other and attracted toward each other.

2. The thermosensitive sensor according to claim 1, wherein:
   the pair of magnet pieces are each formed of a material having electrical conductivity.

3. The thermosensitive sensor according to claim 1, wherein:
   the pair of magnet pieces are each a nonconductive magnet covered by a soft magnetic metal having electrical conductivity.

4. The thermosensitive sensor according to claim 1, wherein:
   the thermal melting substance piece is formed by using, as raw materials, wax comprised predominantly of hydrocarbons.

5. The thermosensitive sensor according to claim 1, wherein:
   the container is formed in a hollow box shape.

6. The thermosensitive sensor according to claim 1, wherein:
   the container is a bag body made of a soft synthetic resin.

7. A thermosensitive sensor, comprising:
   a magnet piece that has electrical conductivity and is connected to one end of a first lead wire;
   a metal piece of soft magnetic material, the metal piece being connected to one end of a second lead wire;
   a thermal melting substance piece that is sandwiched between the magnet piece and the metal piece, the thermal melting substance piece being nonconductive and in solid form, the thermal melting substance piece causing a phase transition from solid to liquid at a predetermined temperature; and
   a container housing the magnet piece, the metal piece and the thermal melting substance piece with the magnet piece and the metal piece maintained out of contact with each other and attracted toward each other.

8. The thermosensitive sensor according to claim 7, wherein:
   the magnet piece is formed of a material having electrical conductivity.

9. The thermosensitive sensor according to claim 7, wherein:
   the magnet piece is nonconductive magnet covered by a soft magnetic metal having electrical conductivity.

10. The thermosensitive sensor according to claim 7, wherein:
    the thermal melting substance piece is formed by using, as raw materials, wax comprised predominantly of hydrocarbons.

11. The thermosensitive sensor according to claim 7, wherein:
    the container is formed in a hollow box shape.

12. The thermosensitive sensor according to claim 7, wherein:
    the container is a bag body made of a soft synthetic resin.

* * * * *